United States Patent
Dean et al.

(10) Patent No.: US 9,659,309 B2
(45) Date of Patent: May 23, 2017

(54) SUGGESTING AND/OR PROVIDING AD SERVING CONSTRAINT INFORMATION

(71) Applicant: Google Inc., Mountain View, CA (US)

(72) Inventors: Jeffrey A. Dean, Palo Alto, CA (US); Georges Harik, Palo Alto, CA (US); Paul Buchheit, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/280,276

(22) Filed: May 16, 2014

(65) Prior Publication Data

US 2015/0012356 A1 Jan. 8, 2015

Related U.S. Application Data

(63) Continuation of application No. 10/389,688, filed on Mar. 14, 2003, now abandoned, which is a continuation-in-part of application No. 10/314,427, filed on Dec. 6, 2002, now Pat. No. 7,716,161.

(60) Provisional application No. 60/413,536, filed on Sep. 24, 2002.

(51) Int. Cl.
G06F 17/30 (2006.01)
G06Q 30/02 (2012.01)

(52) U.S. Cl.
CPC ..... *G06Q 30/0256* (2013.01); *G06F 17/3051* (2013.01); *G06Q 30/02* (2013.01); *G06Q 30/0254* (2013.01); *G06Q 30/0261* (2013.01); *G06Q 30/0277* (2013.01)

(58) Field of Classification Search
CPC .................................................. G06F 17/3051

USPC ............................ 707/751; 705/14.49, 14.53
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,754,938 A | 5/1998 | Herz et al. |
| 5,809,242 A | 9/1998 | Shaw et al. |
| 5,848,397 A | 12/1998 | Marsh et al. |
| 5,887,133 A | 3/1999 | Brown et al. |
| 5,948,061 A | 9/1999 | Merriman |
| 6,026,368 A | 2/2000 | Brown et al. |
| 6,044,376 A | 3/2000 | Kurtzman, II |

(Continued)

FOREIGN PATENT DOCUMENTS

| | | |
|---|---|---|
| JP | 10-254899 | 9/1998 |
| JP | 2000-20536 | 1/2000 |

(Continued)

OTHER PUBLICATIONS

U.S. Appl. No. 10/112,656, filed Mar. 29, 2002, Harik et al.

(Continued)

*Primary Examiner* — Chelcie Daye
(74) *Attorney, Agent, or Firm* — Fish & Richardson P.C.

(57) ABSTRACT

Targeting information (also referred to as ad "serving constraints") or candidate targeting information for an advertisement is identified. Targeting information may be identified by extracting topics or concepts from, and/or generating topics or concepts based on, ad information, such as information from a Web page to which an ad is linked (or some other Web page of interest to the ad or advertiser). The topics or concepts may be relevant queries associated with the Web page of interest, clusters, etc.

20 Claims, 5 Drawing Sheets

(56) References Cited

U.S. PATENT DOCUMENTS

| | | | |
|---|---|---|---|
| 6,078,914 A | 6/2000 | Redfern | |
| 6,134,532 A | 10/2000 | Lazarus et al. | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,308,202 B1 | 10/2001 | Cohn et al. | |
| 6,311,194 B1 | 10/2001 | Sheth et al. | |
| 6,327,574 B1* | 12/2001 | Kramer | G06F 17/30893 705/14.66 |
| 6,356,898 B2 | 3/2002 | Cohen et al. | |
| 6,360,221 B1 | 3/2002 | Gough et al. | |
| 6,366,298 B1 | 4/2002 | Haitsuka et al. | |
| 6,385,592 B1 | 5/2002 | Angles et al. | |
| 6,401,075 B1 | 6/2002 | Mason et al. | |
| 6,449,657 B2 | 9/2002 | Stanbach, Jr. et al. | |
| 6,665,656 B1 | 12/2003 | Carter | |
| 6,665,838 B1 | 12/2003 | Brown et al. | |
| 6,681,223 B1 | 1/2004 | Sundaresan | |
| 6,772,200 B1 | 8/2004 | Bakshi et al. | |
| 6,804,659 B1* | 10/2004 | Graham | G06Q 30/02 705/14.49 |
| 6,985,882 B1 | 1/2006 | Del Sesto | |
| 7,039,599 B2 | 5/2006 | Merriman | |
| 7,136,875 B2 | 11/2006 | Anderson et al. | |
| 7,197,697 B1 | 3/2007 | Tsukamoto | |
| 7,349,876 B1 | 3/2008 | Veach | |
| 7,546,625 B1 | 6/2009 | Kamangar | |
| 7,668,748 B1 | 2/2010 | Veach | |
| 7,716,161 B2 | 5/2010 | Dean et al. | |
| 7,778,872 B2 | 8/2010 | Kamangar et al. | |
| 7,792,698 B1 | 9/2010 | Veach et al. | |
| 7,818,207 B1 | 10/2010 | Veach | |
| 7,844,493 B1 | 11/2010 | Veach et al. | |
| 2001/0056463 A1* | 12/2001 | Grady | G06F 17/30876 709/203 |
| 2002/0120505 A1 | 8/2002 | Henkin et al. | |
| 2002/0123912 A1 | 9/2002 | Subramanian | |
| 2002/0188635 A1 | 12/2002 | Larson | |
| 2003/0083937 A1* | 5/2003 | Hasegawa | G06Q 30/0253 705/14.53 |
| 2004/0073485 A1 | 4/2004 | Liu et al. | |
| 2004/0249709 A1 | 12/2004 | Donovan et al. | |

FOREIGN PATENT DOCUMENTS

| | | |
|---|---|---|
| JP | 2000-357170 | 12/2000 |
| JP | 2001-243256 | 9/2001 |
| JP | 2002-108924 | 4/2002 |
| JP | 2002-259440 | 9/2002 |
| WO | 97/21183 | 6/1997 |
| WO | 01/44992 A1 | 6/2001 |
| WO | 01/63472 A2 | 8/2001 |
| WO | 01/634540 | 8/2001 |

OTHER PUBLICATIONS

U.S. Appl. No. 60/439,174, filed Jan. 10, 2003, Veach.
U.S. Appl. No. 60/424,792, filed Nov. 8, 2002, Veach.
U.S. Appl. No. 60/413,536, filed Sep. 24, 2002, Dean et al.
U.S. Appl. No. 60/317,847, filed Sep. 6, 2001, Manning et al.
U.S. Appl. No. 95/001,073, Reexamination of Stone et al.
U.S. Appl. No. 95/001,069, Reexamination of Stone et al.
U.S. Appl. No. 95/001,068, Reexamination of Stone et al.
U.S. Appl. No. 95/001,061, Reexamination of Stone et al.
PCT International Search Report, for International Application No. PCT/US2003/30234, Mar. 9, 2004.
Acey, Madleine, "Web ads that hit the button, Broker dynamically targets news content," FTMarketWatch, (May 10, 2001), 2 pages.
Ubiquitous Advertising on the WWW: Merging Advertisement on the Browser. Youji Kohda and Susumu Endo. Fifth International World Wide Web Conference. (May 6-10, 1996).
C. Aggarwal, J. Wolf and P. Yu, "A Framework for the Optimizing of WWW Advertising," International IFIP Working Conference on Electronic Commerce, Hamburg, Germany, 1998, published in Trends in Distributed Systems for Electronic Commerce, edited by W. Lamersdorf and M. Merz, Springer-Verlag Lecture Notes in Computer Science, vol. 1402, pp. 1-10, 1998.
Unintrusive Customization Techniques for Web Advertising. Marc Langheinrich et al. Computer Networks. vol. 31. No. 11-16. pp. 1259-1272. (Published 1999).
Recommending from Content: Preliminary Results from an E-Commerce Experiment, Mark Rosenstein and Carol Lochbaum. CHI 2000. Published Apr. 1-6, 2000, The Hague, The Netherlands.
J. Matthews, "Automating Ad Intelligence," Silicon Valley, downloaded from http://www.siliconvalley.intemet.com/news/article.php/3531_, (Jun. 20, 2000) 4 pgs.
Korean Notice of Preliminary Rejection for Korean Application No. 10-2005-7005083, Mailed Nov. 7, 2006, (3 pgs.), with English Language translation (3 pgs.).
The Patent Office of the People's Republic of China, Notification of the First Office Action (PCT Application in the National Phase) for Chinese Patent Application No. 03822800.9, dated Nov. 3, 2006 (7 pgs.).
Examiner First Report on Australian Patent Application No. 2003272687, mailed on May 15, 2007 (2 pages).
Notification of Reasons for Rejection to Japanese Patent Application No. 2005-501983, mailed Nov. 6, 2007 (2 pgs.) with translation (3 pgs.).
Examiner's Report No. 2 on Australian Patent Application No. 2003272687, dated Jul. 3, 2008 (2 pages).
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive fromwww.Archive.org, Apr. 12, 1997 and Feb. 1, 1997.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., Advertising on the Internet, 2nct Ed., John Wiley & Sons, 1999.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
Statement Regarding References.
Notice of Reasons for Rejection for Japanese Patent Application No. 2005-501983, mailed Sep. 2, 2008 (5 pgs.) with translation (6 pgs.).
Canadian Office Action to Canadian Patent Application No. 2,499,778, dated Jan. 14, 2009 (4 pgs.).
Decision of Rejection for Japanese Patent Application No. 2005-501983, mailed May 12, 2009 (2 pgs.) with translation (2 pgs.).
Notification of Third Office Action for Chinese Patent Application No. 03822800.9, mailed Jan. 8, 2010 (3 pgs.) with translation (4 pgs.).
Canadian Office Action for Canadian Patent Application No. 2,499,778, mailed Mar. 9, 2010 (2 pgs.).
Chinese Rejection Decision for Chinese Patent Application No. 03822800.9, mailed Apr. 28, 2010 (3 pgs.) with translation (4 pgs.).

(56) References Cited

OTHER PUBLICATIONS

Office Action for European Patent Application No. 03 754 885.6-1238, mailed Jun. 4, 2010 (5 pgs.).
Notification of Reexamination for Chinese Patent Application No. 03822800.9, mailed May 27, 2011 (4 pgs.) with translation (6 pgs.).
Office Action issued in Brazilian Application No. PI0314728-2 on Aug. 11, 2015, English version only, 5 pages.

* cited by examiner

SUGGESTING AND/OR PROVIDING AD SERVING CONSTRAINT INFORMATION

RELATED APPLICATIONS

This application is a continuation of U.S. Utility application Ser. No. 10/389,688, (incorporated herein by reference) entitled "SUGGESTING AND/OR PROVIDING AD SERVING CONSTRAINT INFORMATION", filed on Mar. 14, 2003 and listing Jeffrey Dean, Georges Hark, Paul Buchheit as inventors, and claims the benefit of U.S. Provisional Application Ser. No. 60/413,536, (incorporated herein by reference) entitled "METHODS AND APPARATUS FOR SERVING RELEVANT ADVERTISEMENTS", filed on Sep. 24, 2002 and listing Jeffrey Dean, Georges Hark, Paul Buchheit as inventors, U.S. patent application Ser. No. 10/314,427 (incorporated herein by reference), entitled "METHODS AND APPARATUS FOR SERVING RELEVANT ADVERTISEMENTS", filed on Dec. 6, 2002 and listing Jeffrey Dean, Georges Hark, Buchheit as inventors, now U.S. Pat. No. 7,716,161, issued on May 11, 2010, and U.S. patent application Ser. No. 10/375,900 (incorporated herein by reference), entitled "SERVING ADVERTISEMENTS BASED ON CONTENT", filed on Feb. 26, 2003, and listing Darrell Anderson, Buchheit, Alex Carobus, Claire Cui, Jeffrey A. Dean, Georges R. Hark, Deepak Jindal, and Narayanan Shivakumar as inventors.

BACKGROUND OF THE INVENTION

A. Field of the Invention

The present invention concerns advertising, such as on-line advertising. More particularly, the present invention concerns helping on-line advertisers to target their ads.

B. Description of Related Art

Advertising using traditional media, such as television, radio, newspapers and magazines, is well known. Advertisers have used these types of media to reach a large audience with their advertisements ("ads"). To reach a more responsive audience, advertisers have used demographic studies. For example, advertisers may use broadcast events such as football games to advertise beer and action movies to a younger male audience. However, even with demographic studies and entirely reasonable assumptions about the typical audience of various media outlets, advertisers recognize that much of their ad budget is simply wasted because the target audience is not interested in the ad they are receiving.

Interactive media, such as the Internet, has the potential for better targeting of advertisements. For example, some websites provide an information search functionality that is based on query keywords entered by the user seeking information. This user query can be used as an indicator of the type of information of interest to the user. By comparing the user query to a list of keywords specified by an advertiser, it is possible to provide some form of targeted advertisements to these search service users. An example of such a system is the Adwords system offered by Google, Inc.

While systems such as Adwords have provided advertisers the ability to better target ads, advertisers would like to have help so that they can target their ads more effectively and/or more easily.

It would be useful, therefore, to have methods, apparatus and data structures for helping advertisers to target their ads more effectively and/or more easily.

SUMMARY OF THE INVENTION

The present invention addresses this and other needs by identifying targeting information (also referred to as ad "serving constraints" or "targeting criteria") for an advertisement. Targeting information may be identified by extracting topics or concepts from, and/or generating topics or concepts based on, ad information, such as for example advertising creatives, information from a Web page to which an ad is linked, etc. Targeting information may also be identified by extracting topics or concepts from, and/or generating topics or concepts based on, other information relevant to the delivery of an ad, such as for example documents (e.g., Web pages) on which an ad is likely to be shown, documents (e.g., Web pages) on which an advertiser is or may be interested in advertising, documents (e.g., Web pages) on which competitive, analogous, or complementary products or services are advertised or to which such are linked, documents (e.g., Web pages) on which competitive, analogous or complementary products or services are offered or described, information related to the geographic targeting or temporal targeting of an ad, documents (e.g., Web pages) similar to any of the above identified documents or sources of information, etc. or in general any other document (e.g., Web page) of interest to the advertiser.

In one embodiment of the invention, the topics or concepts may be words or relevant queries associated with a Web page of interest. In another embodiment of the invention, the topics or concepts may be clusters. Thus, in one embodiment of the present invention, keyword suggestions may be provided to advertisers for keyword triggered advertisements based on topical or conceptual clusters extracted from one or more documents (e.g., Web pages) of interest. Alternatively, or in addition, concept, topic and/or cluster suggestions may be provided to advertisers for concept, topic and/or cluster triggered advertisements.

Additional aspects of the present invention are directed to computer systems and to machine-readable media having features relating to the foregoing aspects.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

The present invention involves methods, apparatus and data structures for determining (e.g., candidate) targeting criteria from a target document or documents. The targeting criteria may then be provided to an advertiser as suggested targeting criteria. In one implementation, the target document is a Web page and the advertisements are electronic files that are capable of being rendered on, or in association with, that Web page. A set, such as a list, of concepts or topics corresponding to the Web page may be generated by analyzing the content of the Web page. There are a variety of techniques by which this may be performed, one of which is by computing a term vector for the Web page and selecting the top N terms from that vector. The list of concepts or topics may then be provided as targeting criteria associated with an advertisement (e.g., keywords specified for the advertisements).

Those skilled in the art will recognize that many other implementations are possible, consistent with the present invention.

A. EXEMPLARY ENVIRONMENT AND ARCHITECTURE

Figure 1:
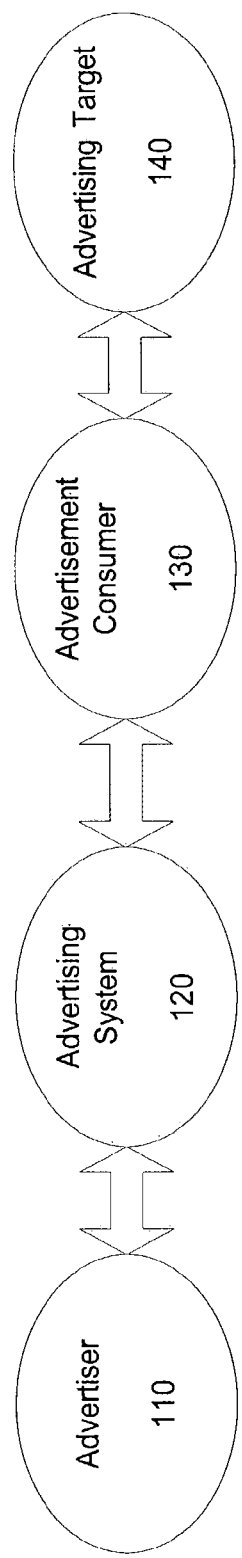
FIG. 1 is a diagram illustrating an environment within which the invention may be implemented.

FIG. 1 is a diagram illustrating an exemplary environment within which the invention may be used. The exemplary environment includes an advertiser 110, an advertising system 120, an advertisement consumer 130, and an advertising target 140.

Advertiser 110 may be the party that directly sells the goods or services being advertised (e.g., Amazon.com) or an agent acting on the advertiser's behalf. The advertisement desired by advertiser 110 may exist in a variety of forms. For example, the advertisement may be a standard print advertisement, an online advertisement, a text advertisement, and image advertisement, an audio advertisement, a video advertisement, audio/visual advertisements, or any other type of sensory message, or combination of the foregoing desired.

Advertising system 120 interfaces with both the advertiser 110 and the advertisement consumer 130. It may perform a variety of functions, as explained in more detail below in reference to FIG. 2. This invention may be used with such an advertising system 120.

Advertisement consumer 130 is the entity that will issue a request for advertisements to advertising system 120, obtain the advertisements from advertising system 120, and present the advertisement to the advertising target 140. Typically, the advertisement consumer is the entity that provides the content with which the advertisement is to be associated. In one implementation, the advertising consumer 130 is a search engine, such as that employed by Google, Inc. at www.google.com.

Advertising target 140 is the individual (or set of individuals) who ultimately receive the advertisement. In the case of visual advertisements, for example, the advertisement target 140 is the person who views the advertisement.

Figure 2:
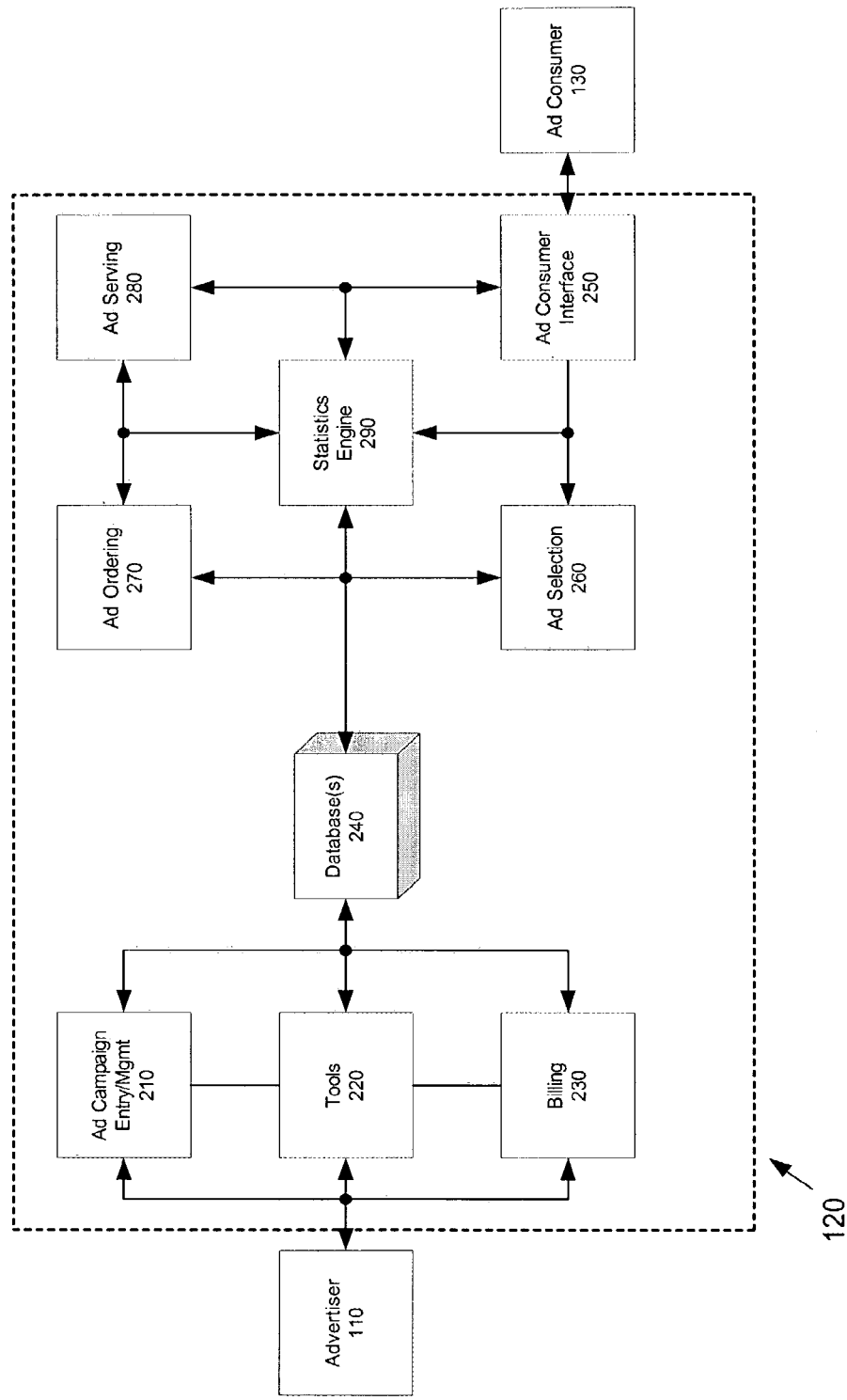
FIG. 2 is a diagram functionally illustrating an advertising system consistent with the invention.

FIG. 2 is a diagram functionally illustrating an advertising system consistent with the invention. The system includes an ad campaign entry and management component 210, a tools component 220, a billing component 230, one or more databases 240, an ad consumer interface component 250, an ad selection component 260, an ad ordering component 270, an ad serving component 280, and a statistics engine component 290. If the present invention is to be used with such an advertising system, it will primarily concern tools component 220. To help understand the invention, other components of the advertising system will be explained below. Furthermore, although FIG. 2 shows a particular arrangement of components constituting advertisement system 120, those skilled in the art will recognize that not all components need be arranged as shown, not all components are required, and that other components may be added to, or replace, those shown.

Ad entry and management component 210 is the component by which the advertiser enters information required for an advertising campaign and manages the campaign. In one embodiment, an ad campaign contains one or more advertisements that are related in some manner. For example, the Ford Motor Company may have an ad campaign for zero percent financing, which could contain a series of advertisements related to that topic. Among the other things that could be provided by an advertiser through ad entry and management component 210 are the following: one or more advertising creatives (simply referred to as "ads" or "advertisements"), one or more set of keywords or topics associated with those creatives (which may be used as targeting information for the ads), geographic targeting information, a value indication for the advertisement, start date, end date, etc. The data required for, or obtained by, ad entry and management component 210 resides in one of the databases 240. In one embodiment of the ad system, the ad entry and management component 210 may perform operations such as those described in: (i) U.S. patent application Ser. No. 10/340,867 (incorporated herein by reference), entitled "PAUSING ONE OR MORE ADS, ONE OR MORE AD GROUPS, AND/OR ON OR MORE AD CAMPAIGNS", filed on Jan. 10, 2003 and listing Salar Kamangar and Amit Patel as inventors; and/or (ii) U.S. patent application Ser. No. 10/340,193 (incorporated herein by reference), entitled "PRICING ACROSS KEYWORDS ASSOCIATED WITH ONE OR MORE ADVERTISEMENTS", filed on Jan. 10, 2003 and listing Eric Veach as the inventor.

Tools component 220 contains a variety of tools designed to help the advertiser 110 create, monitor, and manage its campaigns. For example, tools component 220 may contain a tool for helping advertiser 110 estimate the number of impressions an ad will receive for a particular keyword or topic. Similarly, tools component 220 may be used to help advertiser 110 define targeting criteria, such as a list of keywords, for a given advertisement. Other possible tools may be provided as well. Depending on the nature of the tool, one or more databases 240 may be used to gather or store information. In one embodiment of the ad system, the tools component 220 may perform operations such as those described in U.S. Provisional Application Ser. No. 60/439, 354 (incorporated herein by reference), entitled "METHOD AND APPARATUS FOR ESTIMATING ELECTRONIC ADVERTISING INVENTORY", filed on Jan. 10, 2003 and listing Magnus Sandburg, Eric Veach, John Bauer and Zhe Qian as inventors.

Billing component 230 helps perform billing-related functions. For example, billing component 230 generates invoices for a particular advertiser 110 or ad campaign. In addition, billing component 230 may be used by advertiser 110 to monitor the amount being expended for its various campaigns. The data required for, or obtained by, billing component 230 resides in a database 240. In one embodiment of the ad system, the billing component 230 may perform operations such as those described in: (i) U.S. Provisional Application Ser. No. 60/424,792 (incorporated herein by reference), entitled "AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION", filed on Nov. 8, 2002 and listing Eric Veach as the inventor; (ii) U.S. patent application Ser. No. 10/340,543 (incorporated herein by reference), entitled "AUTOMATED PRICE MAINTE-NANCE FOR USE WITH A SYSTEM IN WHICH ADVERTISEMENTS ARE RENDERED WITH RELA- TIVE PREFERENCES", filed on Jan. 10, 2003 and listing Eric Veach and Salar Kamangar as inventors; and/or (iii) U.S. patent application Ser. No. 10/340,542 (incorporated herein by reference), entitled "AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION", filed on Jan. 10, 2003 and listing Eric Veach and Salar Kamangar as inventors.

Databases 240 contain a variety of data used by advertising system 120. In addition to the information mentioned above in reference to ad entry and management system 210, databases 240 may contain statistical information about what ads have been shown, how often they have been shown, the number of times they have been selected, who has selected those ads, how often display of the ad has led to consummation of a transaction, etc. Although the databases 240 are shown in FIG. 2 as one unit, one of ordinary skill in the art will recognize that multiple databases may be employed for gathering and storing information used in advertising system 120.

Ad consumer interface 250 is a component that interfaces with ad consumer 130 to obtain or send information. For example, ad consumer 130 may send a request for one or more advertisements to ad consumer interface 250. The request may include information such as the site requesting the advertisement, any information available to aid in selecting the advertisement, the number of ads requested, etc. In response, ad consumer interface 250 may provide one or more advertisements to ad consumer 130. In addition, ad consumer 130 may send information about the performance of the advertisement back to the ad system via the ad consumer interface 250. This may include, for example, the statistical information described above in reference to a database 240. The data required for, or obtained by, ad consumer interface component 250 resides in a database 240.

Ad selection component 260 receives a request for a specified number of advertisements, coupled with information to help select the appropriate advertisements. This information may include, for example, a search query specified by an end user. Alternatively, or in addition, as described in more detail below, this information may include data related to the content of the page for which the advertisements are being requested. In one embodiment of the ad system, the ad selection component 260 may perform operations such as those described in: (i) U.S. Provisional Application Ser. No. 60/413,536 (incorporated herein by reference), entitled "METHODS AND APPARATUS FOR SERVING RELEVANT ADVERTISEMENTS", filed on Sep. 24, 2002 and listing Jeffrey Dean, Georges Harik and Paul Buchheit as inventors; (ii) U.S. patent application Ser. No. 10/314,427 (incorporated herein by reference), entitled "METHODS AND APPARATUS FOR SERVING RELEVANT ADVERTISEMENTS", filed on Dec. 6, 2002 and listing Jeffrey Dean, Georges Harik and Paul Buchheit as inventors; and/or (iii) U.S. patent application Ser. No. 10/375,900, (incorporated herein by reference), entitled "SERVING ADVERTISEMENTS BASED ON CONTENT", filed on Feb. 26, 2003 and listing Darrell Anderson, Paul Buchheit, Alex Carobus, Claire Cui, Jeffrey Dean, Georges Harik, Deepak Jindal, and Narayanan Shivakumar as inventors.

Ad ordering component 270 receives a list of relevant ads from ad selection component 260 and determines a preference order (or some other preference attribute such as size, position, volume, etc.) in which they should be rendered to an end user. For example, relevant ads may be ordered based on a value indication associated with each ad. These ordered ads may be provided to an ad serving component 280. In one embodiment of the ad system, the ad ordering component 270 may perform operations such as those described in: (i) U.S. Provisional Application Ser. No. 60/317,847 (incorporated herein by reference), entitled "METHODS AND APPARATUS FOR ORDERING ADVERTISEMENTS", filed on Sep. 6, 2001 and listing Jane Manning, Salar Kamangar and Eric Veach as inventors; (ii) U.S. patent application Ser. No. 10/112,656 (incorporated herein by reference), entitled "METHODS AND APPARATUS FOR ORDERING ADVERTISEMENTS BASED ON PERFORMANCE INFORMATION", filed on Mar. 29, 2002 and listing Jane Manning, Salar Kamangar, Eric Veach and Lawrence Page as inventors; and/or (iii) U.S. patent application Ser. No. 10/112,654 (incorporated herein by reference), entitled "METHODS AND APPARATUS FOR ORDERING ADVERTISEMENTS BASED ON PERFORMANCE INFORMATION AND PRICE INFORMATION", filed on Mar. 29, 2002 and listing Salar Kamangar, Ross Koningstein and Eric Veach as inventors.

Ad serving component 280 receives an ordered list of ads from ad ordering component 270, and formats that list into a manner suitable for presenting to ad consumer 130. This may involve, for example, rendering the ads into hypertext markup language (HTML), into a proprietary data format, etc.

Statistics engine 290 contains information pertaining to the selection and performance of advertisements. For example, statistics engine 290 may log the information provided by ad consumer 130 as part of an ad request, the ads selected for that request by ad selection component 260, the order selected by ad ordering component 270, and the presentation of the ads by ad serving component 280. In addition, statistics engine 290 may log information about what happens with the advertisement once it has been provided to ad consumer 130. This includes information such as on what location the ad was provided, what the response was to the advertisement, what the effect was of the advertisement, etc.

In one embodiment of the ad system, optimization operations (not shown) may be used to optimize ad spot inventory, revenue, or both. Such operations (or operations of one of the other components described above) may include those described in: (i) U.S. Provisional Application Ser. No. 60/439,174 (incorporated herein by reference), entitled "SETTING MINIMUM PRICES IN AN ADVERTISING SYSTEM", filed on Jan. 10, 2003 and listing Eric Veach as the inventor; (ii) U.S. patent application Ser. No. 10/350,898 (incorporated herein by reference), entitled "DETERMINING A MINIMUM PRICE", filed on Jan. 24, 2003 and listing Eric Veach as the inventor; and/or (iii) U.S. patent application Ser. No. 10/340,553 (incorporated herein by reference), entitled "GOVERNING THE SERVING OF ADVERTISEMENTS BASED ON A COST TARGET", filed on Jan. 10, 2003 and listing Eric Veach as the inventor.

Online ads, such as those used in the exemplary systems described above with reference to FIGS. 1 and 2, or any other system, may have various features. Such features may be specified by an application and/or an advertiser. These features are referred to as "ad features" below. For example, in the case of a text ad, ad features may include a title line, ad text, executable code, an embedded link, etc. In the case of an image ad, ad features may additionally include images, etc. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad is served (including one or more topics or concepts determined to be associated with the page, information or content located on or within the page, information about the page such as the host of the page (e.g. AOL, Yahoo, etc.), the importance of the page as measured by e.g. traffic, freshness, quantity and quality of links to or from the page etc., the location of the page within a directory structure, etc.), a search query or search results associated with the serving of the ad, a user characteristic (e.g., their geographic location, the language they use, the type of browser used, previous page views, previous behavior), a host or affiliate site (e.g., America Online, Google, Yahoo) that initiated the request that the ad is served in response to, an absolute position of the ad on the page on which it is served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as conditions or constraints. When used as serving conditions or constraints, such serving parameters are referred to simply as "serving constraints". Serving constraints may also be referred to as "targeting criteria". For example, in some systems, an advertiser may be able to specify that its ad is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a Web page being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extensions of such information (e.g., information derived from ad related information).

A "document" is to be broadly interpreted to include any machine-readable and machine-storable work product. A document may be a file, a combination of files, one or more files with embedded links to other files, etc.; the files may be of any type, such as text, audio, image, video, etc. Parts of a document to be rendered to an end user can be thought of as "content" of the document. Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

Figure 3:
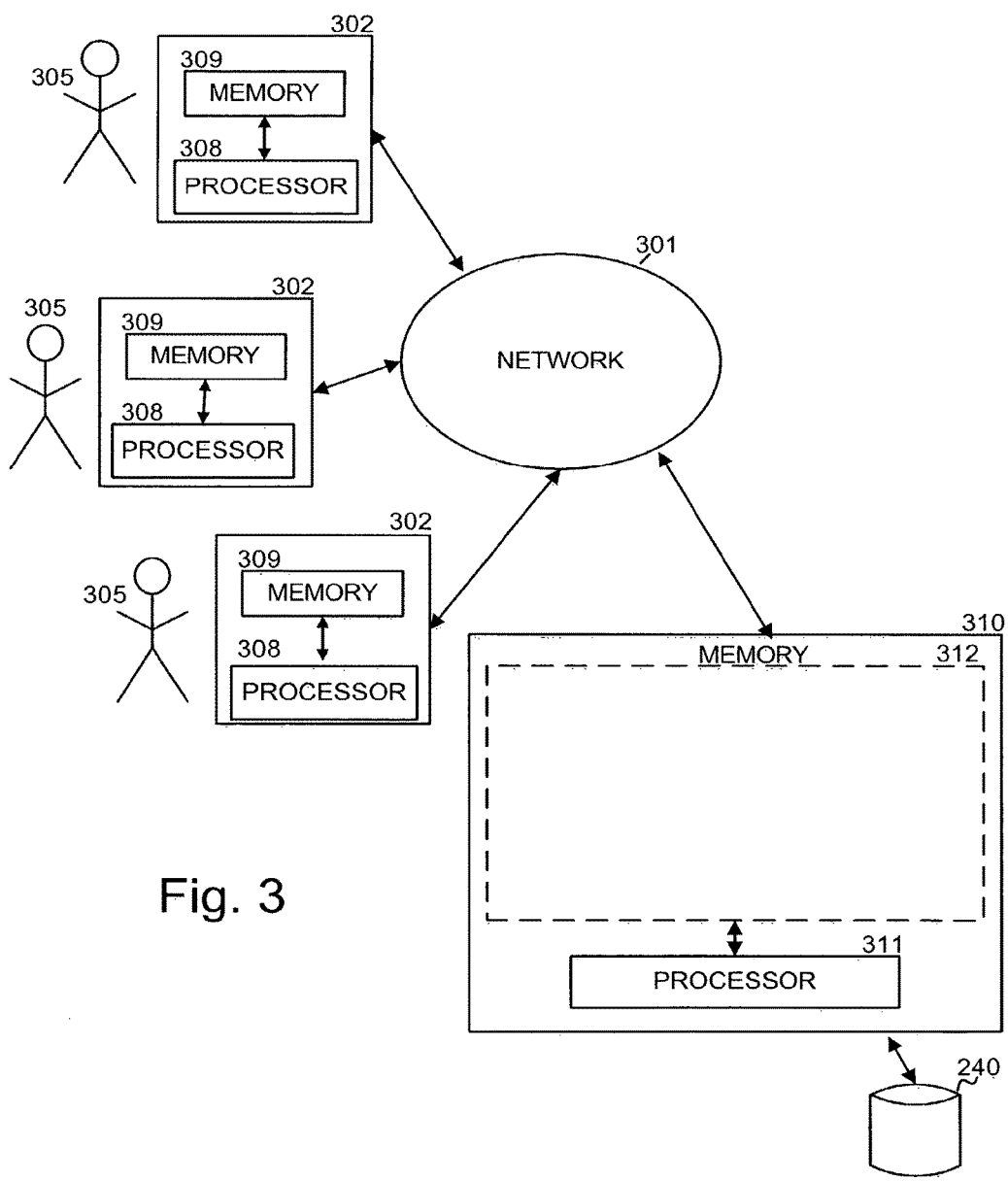
FIG. 3 is a diagram illustrating apparatus with which the invention may be implemented.

FIG. 3 is a diagram illustrating an architecture in which the present invention may be implemented. The architecture includes multiple client devices 302, a server device 310, and a network 301, which may be, for example, the Internet. Client devices 302 each include a computer-readable medium 309, such as random access memory, coupled to a processor 308. Processor 308 executes program instructions stored in memory 309. Client devices 302 may also include a number of additional external or internal devices, such as, without limitation, a mouse, a CD-ROM, a keyboard, and a display. Thus, as will be appreciated by those skilled in the art, the client devices may be personal computers, personal digital assistances, mobile phones, content players, etc.

Through client devices 302, requestors 305 can communicate over network 301 with each other and with other systems and devices coupled to network 301, such as server device 310. Requestors 305 may, for example, be advertisers 110, advertisement consumer 130, or advertising target 140.

Similar to client devices 302, server device 310 may include a processor 311 coupled to a computer readable memory 312. Server device 310 may additionally include a secondary storage element, such as a database 240.

Client processors 308 and server processor 311 can be any of a number of well known micro-processors, such as processors from Intel Corporation, of Santa Clara, Calif. In general, client device 302 may be any type of computing platform connected to a network and that interacts with application programs, such as a digital assistant or a "smart" cellular telephone or pager. Server 310, although depicted as a single computer system, may be implemented as a network of computer processors.

Memory 312 may contain a number of programs, such as the components described above in reference to FIG. 2.

B. EXEMPLARY METHODS

Figure 4:
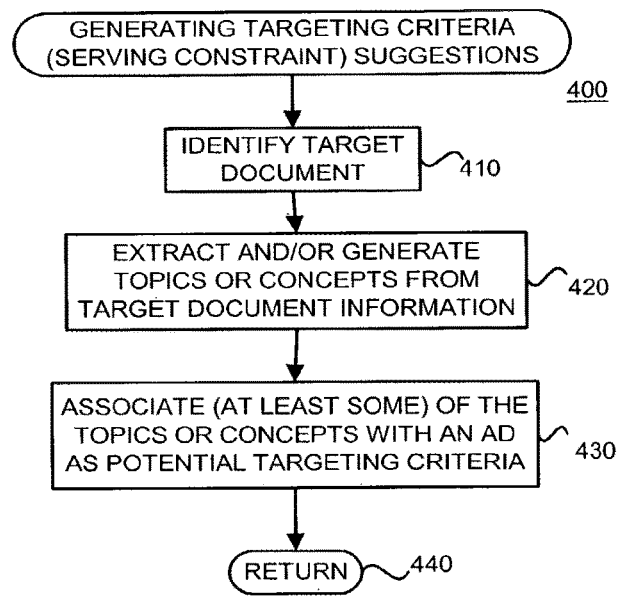
FIG. 4 is a flow diagram of an exemplary method for identifying (e.g., candidate) targeting criteria for an advertiser, consistent with the present invention.

FIG. 4 is a flow diagram of an exemplary method 400 for determining (e.g., candidate) targeting criteria based on a target document, consistent with the present invention. For purposes of illustrating the invention in the context of an ad system such as the one depicted in FIG. 2, it may be understood that the method 400 described herein may take place as part of the tools component 220, although those skilled in the art will recognize that it need not take place in that component 220, or that component 220 alone.

The exemplary method 400 is not limited by the order shown in the flow diagram. The method 400 identifies one or more target documents. (Block 410) The target document(s) may be the Web page linked with an advertisement, Web pages on which an advertiser is interested in showing its ads, or any other document as previously described. Alternatively, or in addition, the target document or documents may be determined algorithmically, based on ad information. Alternatively, or in addition, the target documents may be specified by an advertising user.

Concepts or topics are extracted and/or generated from document information associated with the identified target documents. (Block 420) At least some of the concepts or topics extracted and/or generated are then associated with the ad at issue as targeting criteria and/or potential targeting criteria. (Block 430) In one embodiment, potential targeting criteria are simply suggestions, though such potential targeting criteria may also be used to automatically target ads. In one embodiment, potential targeting criteria is used as targeting criteria unless removed (e.g., by the advertiser). In another embodiment, potential targeting criteria is not used as targeting criteria unless selected for inclusion (e.g., by the advertiser). In yet another embodiment, a first set of the potential targeting criteria is only used as targeting criteria if it (or constituents of the set) is selected for inclusion, while another set of the potential targeting criteria is used unless it (or constituents of the set) is removed. Although not shown, the topics or concept may also be useful in generating or suggesting ad information, such as text in an ad creative.

Extracting and/or Generating Concepts or Topics

One way to identify a topic corresponding to the target document is by analyzing some or all text within the target document. It could be determined that one or more of each term (word or phrase) that appears in the title of the target document corresponds to a topic of the target document. Alternatively, it could be determined that one or more of each term that appears in the body of the target document corresponds to a topic of the target document. In a simple case, each term within the target document could be identified as a topic. A slightly more complex approach would be to identify a term as a topic if it appears in the target document more than N times, such as N=2 (and indeed such a threshold-based approach could be used whenever terms within text are being analyzed). Even more complex analysis could be performed, such as by using a term vector for the target document which assigns weights to each term. For example, terms that appear frequently in the target document may be assigned a relatively higher weight than those that appear less frequently.

In addition, the weighting could be adjusted to give higher weight to terms that appear less frequently in a collection, such as a collection to which the document belongs or the general collection of documents. In any situation where terms within text are assigned weights or scores, those resulting scores may be used to determine which terms will be identified as topics for the target document. For example, it may be determined that only the top scoring term would constitute a topic for the target document. Alternatively, or in addition, it may be determined that the top Z terms (or a subset thereof) will constitute topics for the target document, with Z being some defined number. Alternatively, or in addition, it may be determined that terms having a score that exceeds Y (or a subset thereof) will constitute topics for the target document, with Y being some defined number. Thus, topics may be determined based on absolute and/or relative criteria.

Alternatively, or in addition to using text or other information within the target document, meta-information associated with the target document may be used. In the context of a Web page, this may be anchor text. One or more such brief descriptions may be used to revise (figuratively) the target document by supplementing or replacing some or all of its content with the brief descriptions. So, for example, the topic could be identified from the combination of the target document's title and the brief descriptions of the target document.

Alternatively, or in addition to the brief descriptions from these references, the references themselves may be used. For example, a reference from another document to the target document may be used as an indication that the two documents are similar. Alternatively, or in addition, a reference from the target document to another document may be used as an indication that the two documents are similar. On this basis, the content (or meta-information) of the other document may be used to revise (figuratively) the target document by supplementing or replacing its content with that of the other document. The revised target document's content may then be analyzed using the techniques described above to identify one or more topics.

Alternatively, or addition to using the content (including perhaps metadata) associated with a target document, other techniques may be used to identify one or more topics for the target document. For example, the top N queries (or subset thereof) that result in a reference to the target document could be determined to constitute a topic for the target document, with N being some defined number. These may be, for example, text queries in a search engine that yield a result that links to the target document or web page. Alternatively, or in addition, the content of other similar documents (e.g., in the same collection as the target document, in the same category as the target document, etc.) may be used to revise (figuratively) the content of the target document. Any of the techniques described above may then be used to analyze the target document to identify one or more topics. In the context of Web pages, this may be other Web pages that are stored within a subdirectory of related pages on the same host as the target Web page. Alternatively, or in addition, any technique for classifying the target document into a set of one or more topics or categories may be used. Even the search query history of one or more users who visit the target document (or target Web page) may be used to identify a topic for the target document, on the theory that a visit to the target document that is temporally proximate to that search query history indicates that the user thought the concepts were related.

Using one or more of the various techniques described above, or other techniques, one or more topics may be identified for the target document. Once these topics have been identified, a variety of techniques may be used to determine other topics that are related to those identified topics. For example, a thesaurus could be used to determine other topics (e.g., synonyms) that are closely related to the identified topics, or that are conceptually similar to the identified topics.

For the sake of clarity, the foregoing references to "revising" the target document are a figurative aid in understanding the use of additional information that is not literally within the target document. Those skilled in the art will recognize that the target document need not be actually revised to make use of this additional information.

U.S. Provisional Application Ser. No. 60/416,144, entitled "Methods and Apparatus for Probabilistic Hierarchical Inferential Learner" filed on Oct. 3, 2002 (incorporated herein by reference) describes exemplary ways to determine one or more concepts or topics of information that may be used consistent with the principles of the present invention.

C. EXEMPLARY APPARATUS

Figure 5:
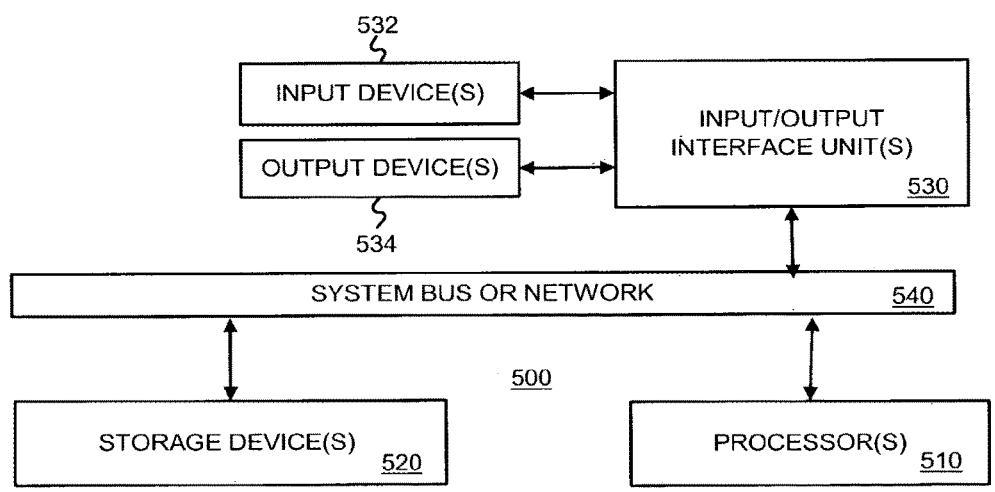
FIG. 5 is an exemplary apparatus that may be used to perform various acts or store various information in a manner consistent with principles of the present invention.

FIG. 5 is high-level block diagram of a machine 500 that may effect one or more of the operations discussed above. The machine 500 basically includes one or more processors 510, one or more input/output interface units 530, one or more storage devices 520, and one or more system buses and/or networks 540 for facilitating the communication of information among the coupled elements. One or more input devices 532 and one or more output devices 534 may be coupled with the one or more input/output interfaces 530.

The one or more processors 510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 520 and/or may be received from an external source via one or more input interface unit s530.

In one embodiment, the machine 500 may be one or more conventional personal computers. In this case, the processing units 510 may be one or more microprocessors. The bus 540 may include a system bus. The storage devices 520 may include system memory, such as read only memory (ROM) and/or random access memory (RAM). The storage devices 520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through an appropriate interface 530 coupled to the system bus 540. The output devices 534 may include a monitor or other type of display device, which may also be connected to the system bus 540 via an appropriate interface. In addition to (or instead of) the monitor, the personal computer may include other (peripheral) output devices (not shown), such as speakers and printers for example.

D. ILLUSTRATIVE OPERATIONS OF AN EXEMPLARY EMBODIMENT

Figure 6:
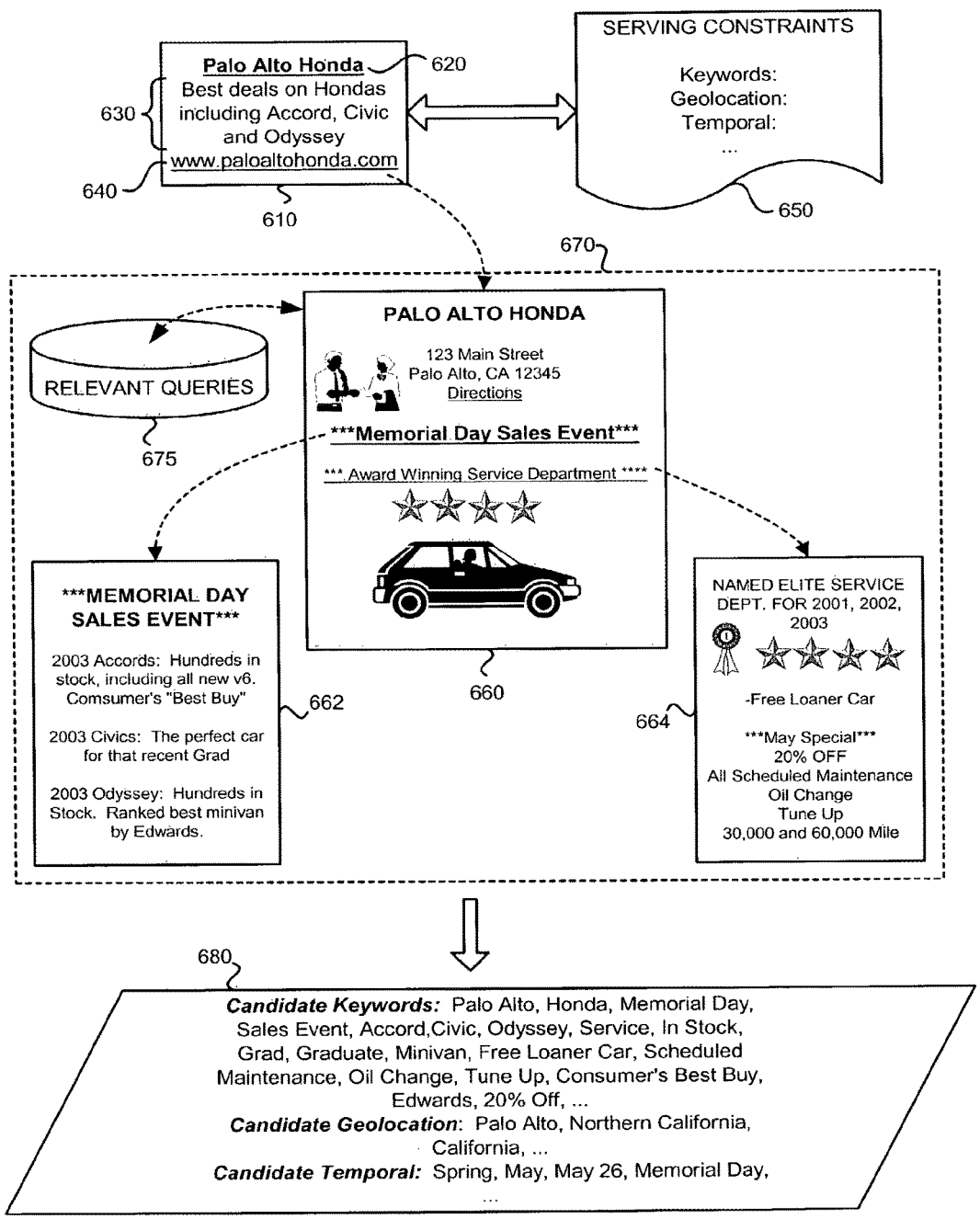
FIG. 6 is an example in which a Web page is a target document.

FIG. 6 illustrates operations of an exemplary embodiment of the invention used in the context of suggesting keywords and other targeting criteria in the context of text ads with a link to an advertiser's Web page. As shown in FIG. 6, a text-based ad 610 includes title text 620, body text 630, and a link 640 to a desired Web page 660. One or more targeting criteria or serving constraints 650 may be associated with the text-based ad 610.

As further illustrated in this example, the Web page 660 linked from the text-based ad 610 includes further links (indicated by dashed arcs) to further Web pages 662 and 664. Relevant queries 675, such as past queries that have returned a link to Web page 660 and/or potential queries that would return a link to Web page 660 may be available (for example, from a search engine).

In this example, target documents 660, 662, 664 were identified (Recall, e.g., block 410.) from the ad itself 610. In this example, topics or concepts may have been extracted and/or generated (Recall block 420.) from some or all of the information 670, and/or information from the ad 610 itself. Finally, some or all of these concepts or topics may be provided as candidate targeting criteria or serving constraints 680 (Recall block 430.), such as suggested keywords, geo-location serving constraints, and/or temporal serving constraints.

E. CONCLUSIONS

The foregoing description of preferred embodiments of the present invention provides illustration and description, but is not intended to be exhaustive or to limit the scope of the invention to the precise form disclosed. Modifications and variations are possible in light of the above teachings or may be acquired from practice of the invention.

What is claimed:
1. A method comprising:
identifying, by one or more processing devices, a target document based on information provided by a content provider through a user interface displayed on a computing device, the content provider being a purveyor of content that is distributable electronically;
generating, by the one or more processing devices and based on information associated with the target document and information associated with a separate document that references the target document or that the target document references, a set of distribution terms representing concepts represented in the target document, the distribution terms defining one or more serving constraints comprising one or more conditions limiting distribution of the content, wherein generating the set of distribution terms comprises:
analyzing the information associated with the target document to identify terms representing a first set of concepts related to the target document;
revising the information associated with the target document by supplementing or replacing at least some of the information associated with the target document with at least some of the information from the separate document without revising content within the target document, the at least some of the information from the separate document including additional terms representing a second set of concepts different from the first set of concepts;
analyzing the revised information associated with the target document to identify the additional terms in the revised information; and
selecting, for inclusion in the set of distribution terms and from the terms and the additional terms, at least one of the terms and at least one of the additional terms;
storing, in computer memory and by the one or more processing devices, the generated set of distribution terms; and
distributing the content for inclusion in an additional document that is not the target document in response to the additional document satisfying at least one of the one or more serving constraints.

2. The method of claim 1, wherein the information provided by the content provider comprises a hyperlink in the content provided through the user interface.

3. The method of claim 1, wherein generating the set of distribution terms comprises determining whether the concept appears in the target document greater than a predetermined number of times.

4. The method of claim 1, wherein generating the set of distribution terms comprises determining that the concept corresponds to one of plural terms that is weighted based on a frequency of appearance in the target document.

5. The method of claim 1, wherein generating the set of distribution terms comprises determining that the concept comprises one of plural different concepts that appear more than a threshold number of times.

6. The method of claim 1, wherein generating the set of distribution terms comprises identifying the concept based on metadata associated with the target document.

7. The method of claim 1, wherein generating the set of distribution terms is based on information in search queries that result in a reference to the target document.

8. The method of claim 1, wherein generating the set of distribution terms comprises identifying a predetermined number of queries that result in a reference to the target document and that reference the target document more than one or more other queries that reference the target document.

9. The method of claim 1, further comprising:
identifying additional concepts based on the concepts in the target document, the additional concepts being related to the concepts in the target document;
wherein the one or more serving constraints are based also on the additional concepts.

10. The method of claim 1, wherein the content comprises online advertising, and the additional document comprises one or more Web pages that have at least some subject matter in common with the target document.

11. One or more non-transitory machine-readable storage media storing instructions that are executable by one or more processing devices to perform operations comprising:
identifying, by the one or more processing devices, a target document based on information provided by a content provider through a user interface displayed on a computing device, the content provider being a purveyor of content that is distributable electronically;
generating, by the one or more processing devices and based on information associated with the target document and information associated with a separate document that references the target document or that the target document references, a set of distribution terms representing concepts represented in the target document, the distribution terms defining one or more serving constraints comprising one or more conditions limiting distribution of the content, wherein generating the set of distribution terms comprises:
analyzing the information associated with the target document to identify terms representing a first set of concepts related to the target document;
revising the information associated with the target document by supplementing or replacing at least some of the information associated with the target document with at least some of the information from the separate document without revising content within the target document, the at least some of the information from the separate document including additional terms representing a second set of concepts different from the first set of concepts;
analyzing the revised information associated with the target document to identify the additional terms in the revised information; and
selecting, for inclusion in the set of distribution terms and from the terms and the additional terms, at least one of the terms and at least one of the additional terms;
storing, in computer memory and by the one or more processing devices, the generated set of distribution terms; and
distributing the content for inclusion in an additional document that is not the target document in response to the additional document satisfying at least one of the one or more serving constraints.

12. The one or more non-transitory machine-readable storage media of claim 11, wherein the information provided by the content provider comprises a hyperlink in the content provided through the user interface.

13. The one or more non-transitory machine-readable storage media of claim 11, wherein generating the set of distribution terms comprises determining whether the concept appears in the target document greater than a predetermined number of times.

14. The one or more non-transitory machine-readable storage media of claim 11, wherein generating the set of distribution terms comprises determining that the concept corresponds to one of plural terms that is weighted based on a frequency of appearance in the target document.

15. The one or more non-transitory machine-readable storage media of claim 11, wherein generating the set of distribution terms comprises determining that the concept comprises one of plural different concepts that appear more than a threshold number of times.

16. The one or more non-transitory machine-readable storage media of claim 11, wherein generating the set of distribution terms comprises identifying the concept based on metadata associated with the target document.

17. The one or more non-transitory machine-readable storage media of claim 11, wherein generating the set of distribution terms is based on information in search queries that result in a reference to the target document.

18. The one or more non-transitory machine-readable storage media of claim 11, wherein generating the set of distribution terms comprises identifying a predetermined number of queries that result in a reference to the target document and that reference the target document more than one or more other queries that reference the target document.

19. The one or more non-transitory machine-readable storage media of claim 11, wherein the operations comprise:
identifying additional concepts based on the concepts in the target document, the additional concepts being related to the concepts in the target document;
wherein the one or more serving constraints are based also on the additional concepts.

20. The one or more non-transitory machine-readable storage media of claim 11, wherein the content comprises online advertising, and the additional document comprises one or more Web pages that have at least some subject matter in common with the target document.

* * * * *